United States Patent [19]

Gale

[11] Patent Number: 5,067,516

[45] Date of Patent: Nov. 26, 1991

[54] VALVE ASSEMBLY

[76] Inventor: Keith F. Gale, 33 Kennedy Street, Glen Waverley, Victoria, 3150, Australia

[21] Appl. No.: 583,200

[22] Filed: Sep. 17, 1990

[51] Int. Cl.[5] .................. F16K 31/34; F16K 33/00
[52] U.S. Cl. ......................... 137/414; 137/436; 251/28; 251/35; 251/46
[58] Field of Search .............. 137/414, 442, 443, 444, 137/434, 436; 251/35, 45, 46, 28

[56] References Cited

U.S. PATENT DOCUMENTS

| 509,401 | 11/1893 | Scott | 251/46 |
|---|---|---|---|
| 2,318,236 | 5/1943 | Layton | 137/414 |
| 2,876,981 | 3/1959 | McNown | 251/46 |
| 3,693,649 | 9/1972 | Gordon et al. | 137/414 |
| 3,712,578 | 1/1973 | Dawson | 251/35 |
| 4,072,164 | 2/1978 | Kaden | 137/414 |
| 4,094,327 | 6/1978 | Brandelli | 137/414 |
| 4,505,450 | 3/1985 | Saarem et al. | 251/46 |
| 4,529,002 | 7/1985 | Jacobson | 137/414 |
| 4,911,401 | 3/1990 | Holcomb et al. | 251/45 |

FOREIGN PATENT DOCUMENTS 85711  6/1955  Norway .................... 137/414

Primary Examiner—George L. Walton
Attorney, Agent, or Firm—Marion P. Lelong

[57] ABSTRACT

A pilot-operated, diaphragm-controlled float valve assembly has a primary valve and a pilot valve operated by a float arm, a cavity for the main valve is formed between a split segment casing and is divided by a valve disc centrally mounted upon a flexible diaphragm into a lower, larger, pressure-differential chamber and an upper, smaller, pressure-differential chamber, both chambers being fluidly connected by a variable restricting orifice formed by a gap between an axial bore in the valve disc and a fixed guide rod for the disc. The top of the guide rod acts as a seat for a pilot valve; a lateral bore extends through the top of the guide rod and another through the base of the valve, enabling water to flow into both pressure differential chambers when the main valve outlet is held normally closed against its seat by bias of the diaphragm to prevent backflow under low pressure conditions.

9 Claims, 3 Drawing Sheets

VALVE ASSEMBLY

This invention relates generally to valves and relates more particularly to a pilot float valve assembly for controlling the level of liquid in a tank, reservoir or the like.

SUMMARY OF THE INVENTION

It is an object of this invention to provide a pilot-operated, diaphragm-controlled, float valve assembly which minimizes the number of closely toleranced parts.

Another object is to provide a pilot-operated, diaphragm-controlled, float valve assembly which eliminates the requirement for springs.

A further object is to provide a pilot-operated, diaphragm-controlled, float valve assembly which substantially eliminates the flow disturbance known as "water hammer".

In accordance with these objects and the principles of this invention a pilot-operated, diaphragm-controlled, float valve assembly is provided with a two-segment split casing comprising:

a) upper and lower casing segments having mating flanged edges joined to form a main valve cavity therebetween, the upper segment having a pilot valve which comprises a piston reciprocatable within a cylinder in response to movement of a float lever arm which is pivotally mounted on the upper casing segment and the lower segment having a side fluid inlet and a bottom fluid outlet formed therein so that fluid entering the inlet flows on top of an annular valve seat surrounding the bottom outlet;

b) a fixed, vertically disposed guide post which is centrally mounted upon and subtends from inside the top of the upper casing segment and which has an axial bore extending through only its upper portion and a lateral bore which joins and is in fluid communication with the axial bore, the top of the guide post axial bore forming a fixed valve-sealing seat for the pilot valve and being in fluid communication with a discharge bore in the upper casing segment when the pilot valve is open;

c) a main valve annular seat which sealably surrounds the bottom fluid outlet;

d) a single, flexible, self-supporting diaphragm which has a flanged outer edge mounted between the flanged edges of the casing segments and which divides the main valve cavity between the segments into upper and lower valve chambers, the upper valve chamber being in fluid communication with the lateral bore and the axial bore at all times and with the discharge bore when the pilot valve is open, and the lower valve chamber being in fluid communication with the inlet at all times and with the outlet when the main valve lower valve chamber being in fluid communication with the inlet at all times and with the outlet when the main valve is open;

e) a main valve disc which is mounted within a central circular aperture in the diaphragm and reciprocates with the diaphragm between the valve chambers, the disc having:

1) a bottom which forms a valve sealing surface for the annular seat of the main valve and is held in a normally fully closed position against the seat by bias of the diaphragm to enable the valve to operate from very low fluid pressures and to prevent backflow from the outlet to the inlet if a vacuum occurs at the inlet, 2) an axial bore which extends partly through the length thereof from the top of the disc towards the bottom sealing surface, whereby its surface reciprocates axially along the outer surface of the fixed guide post, an annular restricted fluid flow passage being formed between the axial bore of the valve disc and the outer surface of the fixed guide post to provide fluid communication from the lower valve chamber to the upper valve chamber and thence, when the pilot valve opens, with the guide post axial bore to the discharge bore, and 3) an opening, in the form of a transverse bore within a lower portion of the main valve disc, which is in fluid communication with the disc axial bore so that fluid can enter the upper chamber even when the main valve and the pilot valve are each in a fully closed position, whereby opening and closing movements of the main valve disc result in part from fluid pressure differentials between lower and upper chambers of the valve.

A perfect pressure balance is achieved by the complementary specially shaped surfaces of the bottom of the diaphragm and the upper surface of the valve disc.

Other features of the invention are:

a) the diaphragm is dish-shaped with an intermediate, upwardly directed, and convexly curved rim portion that causes it to be biased towards the main valve seat;

b) the main valve disc has:
1) a frusto-conical, recessed upper portion, and
2) a cylindrical lower portion with a continuous, sealed bottom surface having a peripheral, annular, flat-topped wall, forming a valve-sealing surface for the main valve annular seat; and c) the top of the fixed guide post serves as a valve seat for the pilot valve which is a secondary valve operated through a lever arm of a ball float.

Other features, uses and advantages of the invention will become apparent from a reading of the following description of the embodiment thereof presented in the accompanying drawings.

BRIEF DESCRIPTION OF THE DRAWINGS

A non-limitative example of a preferred embodiment of the pilot operated ball float valve assembly according to the invention will be described in greater detail by reference to the accompanying drawings in which like reference numbers denote corresponding parts and in which.

DESCRIPTION OF THE PREFERRED EMBODIMENT

Figure 1:
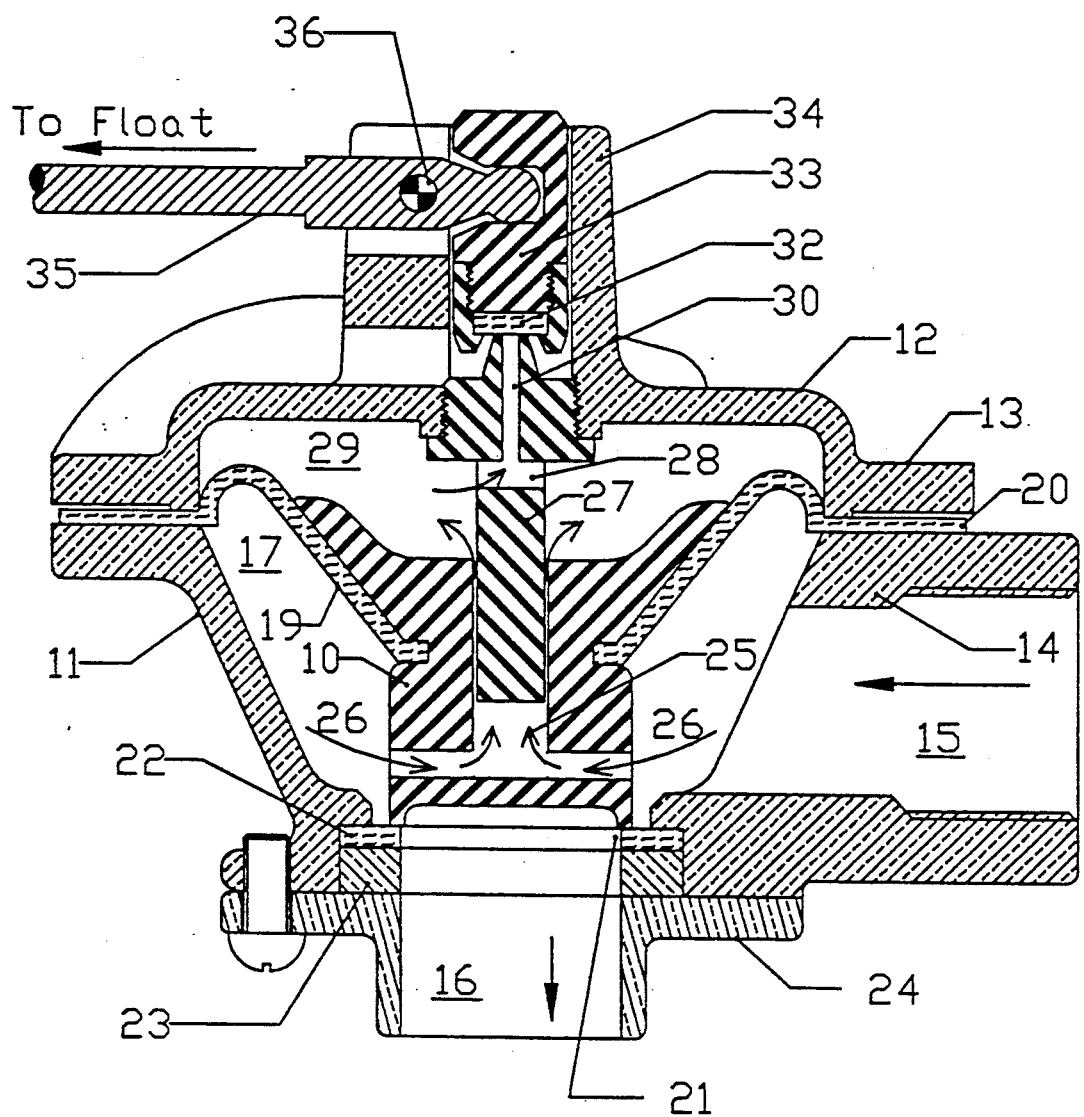
FIG. 1 is a sectional elevational view of a pilot-operated, diaphragm-controlled, ball float valve assembly according to the invention with the primary valve members in closed position.

Referring to FIG. 1, the pilot-operated, diaphragm-controlled, ball float valve assembly comprises a primary valve and a pilot valve, the primary valve mainly comprises a reciprocating primary valve disc 10 which is housed within the cavity of a casing formed in two segments; namely, a lower segment 11 and an upper segment which is a cap 12, both casing segments preferably being cast in bronze and being joined by bolting together the two integral mating flanged portions 13 and 14, respectively, which for this purpose are provided with alignable bolt holes, the holes of the lower segment being internally threaded to enable the two segments to be bolted together via the flanged portions. There is integrally cast within valve casing lower segment 11 an internally threaded side entry port 15 and a bottom outlet port 16.

There is formed between assembled upper and lower valve casing segments 11, 12, a lower or main valve chamber 17 which houses the lower portion or part of a reciprocating, main valve member in the form of a disc 10 moulded of rigid, synthetic polymeric plastics or resin material such as acetal resin or polyvinyl chloride and in the form of a hollow or recessed, frusto conical upper portion and cylindrical intermediate and lower portions, the intermediate portion having an annular groove or channel formed therein for receiving a circular edge of a diaphragm; the bottom of the disc is continuos and has a lowermost surface with peripheral flat-topped wall formed into a primary valve sealing ring 18. The main valve disc 10 is centrally and removably mounted upon self-biasing means in the form of a dish-shaped resilient or flexible and self-supporting diaphragm 19 of natural or synthetic rubber or rubber-like material and which has a peripheral outer flanged portion 20 thereof clamped between the flanged portions 13 and 14 of the upper and lower valve casing segments 11 and 12. The action of the resilient diaphragm 19 ensures that the ring-like sealing disc 18 on the bottom of the main valve disc 10 is always, when in the normally closed position, sealed against the main valve seat 21, formed in part by replaceable resilient annular valve outlet seat washer member 22, when there is no liquid pressure in side entry port 15 preventing backflow of liquid into the valve cavity under conditions of complete pressure drop and when a vacuum occurs in the inlet pipes. This action of diaphragm 19 allows the valve to operate at very low liquid pressures.

Reverting now to the description of the sealing of the valve outlet, outlet seat washer member 22 is housed underneath and removably bolted against the casing lower segment to partly form the bottom of the outlet port by means of retaining ring 23 of hardened synthetic polymeric resin composition, members 22 and 23 being retained in position by flanged bronze seat base 24 which is bolted to the bottom of main valve lower casing segment 11. Main valve disc 10 has a wide, central axial bore 25 extending partly therethrough but not extending axially through the bottom thereof and adjacent the bottom of axial bore 25 of the disc there is formed a transverse bore 26 which extends diametrically entirely through the disc. The bottom of axial bore 25 joins the centre of transverse bore 26, and both bores are in fluid communication with the valve lower chamber 17. Axial bore 25 of main valve disc 10 has a normal vertical attitude when installed and is adapted to reciprocate up and down over a rod of rigid synthetic polymeric material which is an integral part of main valve fixed guide post 27 fixed to the underside of valve body segment or cap 12. The lower and intermediate part of the fixed guide post 27 has a diameter or a surface configuration which is sufficiently less than the axial bore of main valve disc 10 to form a variable restricting orifice clearance between these two members. The upper part of fixed guide member 27 has a lateral bore 28 extending diametrically completely therethrough, forming a fluid connection to a main valve upper or pressure chamber 29 formed between the top of the diaphragm 19 and the underside of the valve cap 12. This lateral bore 28 connects with an axial bore 30 extending through the top part of the fixed guide post 27 and forms a fluid flow passage through the post. The top of the guide post is formed into a pilot valve sealing disc or surface 31 for sealing against a seat-forming, resilient disc 32 on the bottom of pilot valve piston 33 housed in a chamber formed by a recess formed within a boss 34 which is anchorage for ball float lever arm 35 pivotally mounted on the boss by pin 36.

In operation, opening and closing movements of the main valve results in part from pressure differentials between apper and lower valve chambers 29, 17, respectively, and also because of the self-biasing closure design of diaphragm 19. When the valve is open while the disc is lifted off its seat, fluid can pass from the valve inlet port to the outlet port.

Figure 2:
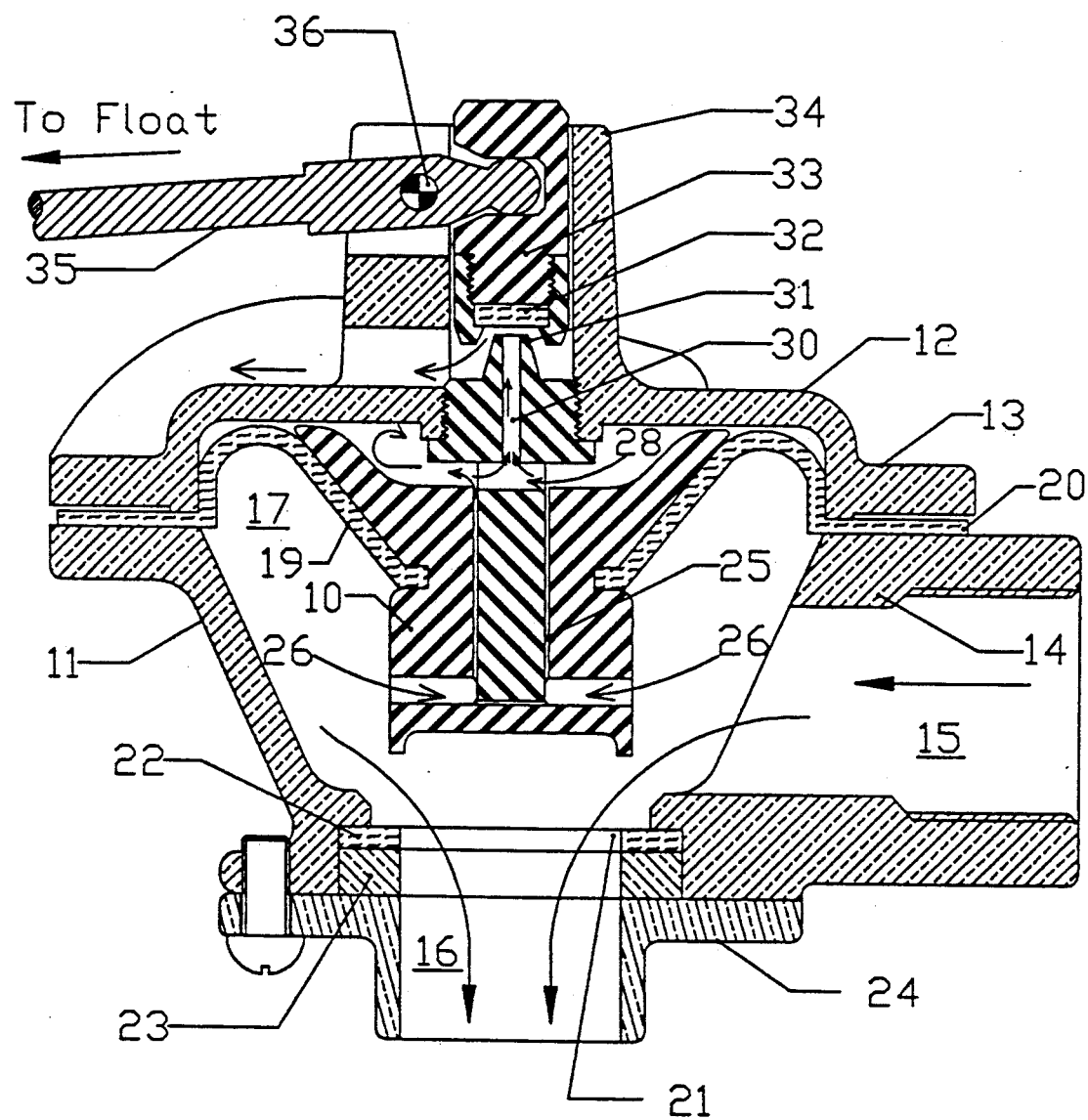
FIG. 2 is a sectional elevational view of the same valve assembly shown in FIG. 1 but with the primary valve members in open position.
Figure 3:
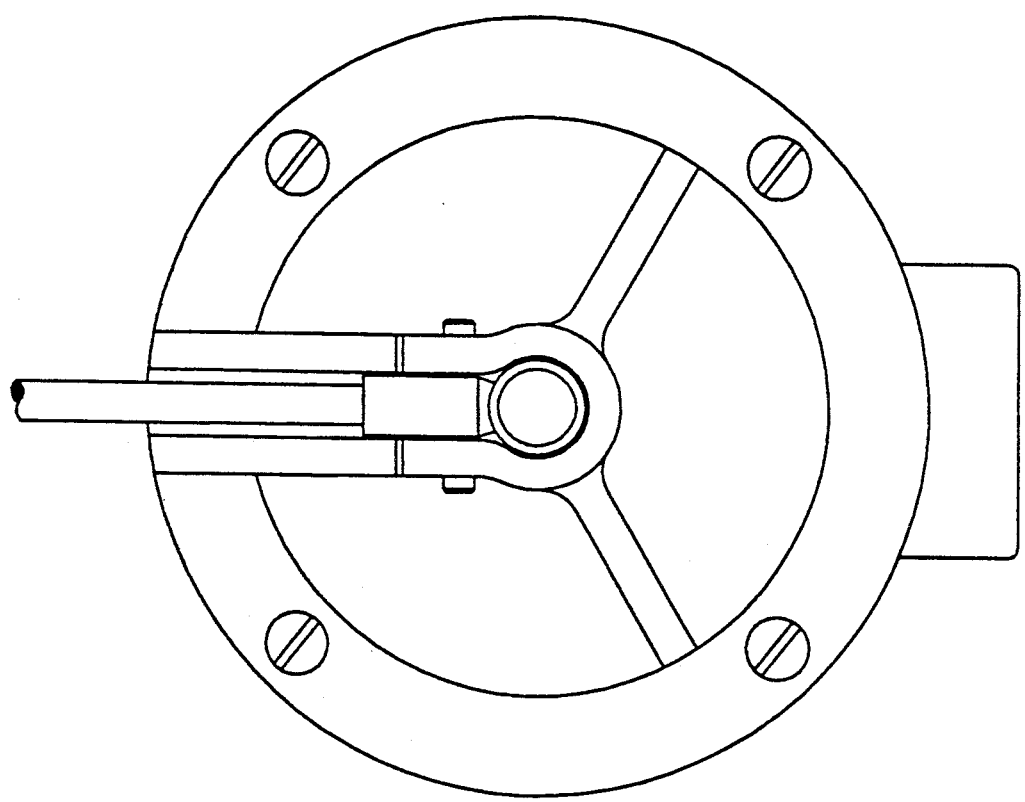
FIG. 3 is a plan view of the valve assembly of FIGS. 1 and 2.

Referring to FIG. 1 which shows the main-valve disc in closed position with approximately equal pressure in upper and lower chambers 29 and 17, respectively, and main-valve disc 10 constrained into a fully closed position by bias of resilient diaphragm 19 whereby greater force acts on the main-valve disc in the upper chamber than in the lower chamber, also due to low pressure in outlet port 16. When a standard ball valve float (not shown) drops as a result of fall in the level of liquid in a tank in which the ball float is installed, pilot valve piston 33 is lifted off its seat 31, thereby causing the pressure in main valve upper chamber 29, formed above diaphragm 19, to drop. As a result of this pressure drop, main valve disc 10 is raised to the open postion shown in FIG. 2.

As level of fluid in the tank returns to a predetermined height, pilot valve piston 33 closes upper fluid flow passages ("axial bores") 28 and 30 as hydraulic pressure builds up in valve upper chamber 29 with the pilot valve in closed position with sealing surface 31 closed against its seat 32, whereby the total surface area under pressure is greater than the area under pressure in main valve lower chamber 17 due to the large surface area at the lower end of main valve disc 10 facing outlet 16 thereby allowing pressure in main valve upper chamber 29 to force main valve disc 10 towards the primary valve seat 21 in contact with washer 22.

Variations and modifications of the invention may be made within the scope of the claims and parts or portions of the pilot operated ball float valve assembly may be used without others and it will therefore be understood that the embodiment described above is in no way restrictive and may give rise to any desirable modification without departing from the scope of the invention.

I claim:

1. A pilot-operated, diaphragm-controlled, float valve assembly with a two-segment split casing comprising upper and lower segments having mating flanged edges joined to form a main valve cavity, the lower segment having a side fluid inlet and a bottom fluid outlet formed therein, fluid entering the inlet flowing onto a main valve annular seat surrounding the bottom outlet, a flexible, self-supporting diaphragm with a flanged edge mounted between the flanged edges of the casing segments and dividing the valve cavity into upper and lower chambers, a main valve disc mounted within a central aperture in the diaphragm for vertical reciprocating movement between the valve chambers in association with movement of the diaphragm, the main valve disc having a bottom forming a valve-sealing surface for the main valve annular seat and being held in a normally fully closed position against the main valve annular seat by bias of the diaphragm, to enable the valve to operate from very low fluid pressures and to prevent backflow from the outlet to the inlet if a vacuum occurs at the inlet, the main valve disc having an axial bore extending partly through the length thereof from the top of the disc to a first closed endwall above the bottom sealing surface, said first endwall defining at least one radial port extending from the outer periphery of said valve disc and into the interior of said valve disc axial bore and said valve disc being adapted to reciprocate axially along a fixed, vertical guide post centrally mounted upon and subtending from inside the top of the upper casing segment, an annular restricted fluid flow passage being formed between the axial bore of the valve disc and outer surface of the fixed guide post, an axial bore extending through an upper portion only of the fixed guide post and joining a transverse bore therein, said guide post axial bore ending at a second closed endwall which defines at least one radial port extending from the outer periphery of said guide post and into the interior of said guide post axial bore, a lower portion of the main valve disc having an opening in fluid communication with the axial bore through said valve disc radial port whereby fluid is able to enter the upper chamber through said valve disc radial port into said valve disc axial bore along the exterior of said guide post when the main valve disc axial bore endwall abuts said guide post and when the main valve and the pilot valve are each in a fully open position, said upper chamber being vented through said pilot valve to the exterior of said float valve assembly when said pilot valve is actuated, opening and closing movements of the main valve disc resulting in part from fluid pressure differentials between the lower and upper chambers, closing movement of the main valve being due to surface area under pressure of the main valve disc facing the upper chamber being greater than the surface area under pressure of said disc facing the lower chamber due to the bottom of the disc facing a low pressure bottom fluid outlet.

2. A pilot-operated, diaphragm-controlled, float valve assembly according to claim 1 wherein the diaphragm is dish-shaped with an intermediate, upwardly directed and convexly curved rim portion, the main valve disc has a bottom surface sealing against the main valve seat by bias of the diaphragm.

3. The pilot-operated, diaphragm-controlled, float valve assembly according to claim 1 wherein the main valve disc has a frusto-conical, recessed upper portion and cylindrical intermediate and lower portions, the lower portion having a continuous, sealed bottom surface with a peripheral, annular, flat-topped wall forming a valve-sealing surface for the main valve annular seat.

4. The pilot-operated, diaphragm-controlled, float valve assembly according to claim 1 wherein the pilot valve is mounted within the upper casing segment and comprises a piston reciprocatable within a cylinder in association with movement of a float lever arm pivotally mounted on the upper casing segment, the top of the fixed guide post surrounding the axial bore forming a fixed valve-sealing seat for the pilot valve the piston of which has a bottom with a resilient sealing member thereon for sealing contact with the seat, the fixed guide post having a bore extending through the upper portion thereof for pressure relief discharge of liquid through the guide post and pilot valve and into a tank, reservoir or the like when the pilot valve is lifted by the float into the open position.

5. A pilot-operated, diaphragm-controlled, float valve assembly with a two-segment split casing comprising upper and lower segments with mating flanged edges joined to form a main valve cavity, a side fluid inlet and a bottom fluid outlet both formed in the lower segment, fluid entering the inlet flowing onto a main valve annular seat surrounding the bottom outlet, a flexible, self-supporting diaphragm with a flanged edge mounted between the casing segments and dividing the valve cavity into upper and lower chambers, the diaphragm having a central aperture with a main valve disc mounted therein for vertical reciprocating movement between the valve chambers in association with movement of the diaphragm, the main valve disc having a concave, cup-shaped, frusto-conical upper portion and a cylindrical lower portion, the lower portion having a continuous, sealed, bottom surface formed with a flat-topped peripheral annular wall forming a sealing surface for the main valve annular seat and being held in a normally full-closed position against the main valve seat by bias of the diaphragm to prevent fluid backflow from the outlet to the inlet under conditions of low fluid pressure, the main valve disc having an axial bore extending partly through the length thereof from the top of the disc to a first closed endwall above the continuous sealed bottom of the disc, said first endwall defining at least one radial port extending from the outer periphery of said valve disc and into the interior of said valve disc axial bore and said valve disc being adapted to reciprocate axially along a fixed, vertical guide post centrally mounted upon and subtending from inside the top of the upper casing segment, an annular restricted flow passage being formed between the bore of the valve disc and outer surface of the fixed guide post, an axial bore extending through an upper portion only of the fixed guide post and joining a transverse bore therein which extends completely therethrough, said guide post axial bore ending at a second closed endwall which defines at least one radial port extending from the outer periphery of said guide post and into the interior of said guide post axial bore, a lower portion of the main valve disc also having a transverse bore extending completely therethrough in fluid communication with the axial bore through said valve disc radial port whereby fluid is able to enter the main valve upper chamber through said valve disc radial port into said valve disc axial bore along the exterior of said guide post and when the main valve disc axial bore endwall abuts said guide post and when the main valve and pilot valve are each in a fully open position, said upper chamber being vented through said pilot valve to the exterior of said float valve assembly when said pilot valve is actuated, opening and closing of the main valve disc resulting in part from fluid pressure differentials between the main valve lower chamber and the upper chamber, closing movement of the main valve being due to surface area under pressure of the main valve disc facing the upper chamber being greater than the surface area under pressure of said disc facing the lower chamber due to the bottom of the disc facing a low pressure bottom fluid outlet.

6. The pilot-operated, diaphragm-controlled, float valve assembly according to claim 5 wherein the cylindrical lower portion of the main valve disc has an external circumferential, flat-walled channel into which there is adapted to be fitted a flanged inner edge forming a central circular aperture of the diaphragm for mounting the main valve disc onto the diaphragm.

7. The pilot-operated, diaphragm-controlled, float valve assembly according to claim 5 wherein the upper portion of the main valve disc is formed with an upstanding peripheral wall which acts as a stop against the upper valve casing segment to limit the vertical upward travel of the valve.

8. A pilot-operated, diaphragm-controlled, float valve assembly with a two-segment split casing comprising upper and lower segments with mating flanged edges joined to form a main valve cavity, a side fluid inlet and a bottom fluid outlet both formed in the lower segment, fluid entering the inlet flowing onto a main valve annular seat surrounding the bottom outlet, a flexible, self-supporting diaphragm with a flanged edge mounted between the casing segments and dividing the valve cavity into upper and lower chambers, the diaphragm being dish-shaped with an intermediate, upwardly directed and convexly curved rim portion causing it to be self-biased towards the main valve annular eat, the diaphragm also having a central aperture with a main valve disc mounted therein for vertical reciprocating movement between the valve chambers in association with movement of the diaphragm, the main valve disc having a concave, cup-shaped, frusto-conical upper portion and a cylindrical lower portion with an external circumferential, flat-walled channel into which there is adapted to be fitted a flanged inner edge forming a central circular aperture of the diaphragm for mounting the main valve disc onto the diaphragm, the lower portion of the main valve disc also having a continuous, sealed, bottom surface formed with a flat-topped peripheral annular wall forming a sealing surface for the main valve annular seat and being held in a normally full-closed position against the main valve seat by bias of the diaphragm to prevent fluid backflow from the outlet to the inlet under conditions of low fluid pressure, the main valve disc having an axial bore extending partly through the length thereof from the top of the disc to a first closed endwall above the continuous sealed bottom of the disc, said first endwall defining at least one radial port extending from the outer periphery of said valve disc and into the interior of said valve disc axial bore and said valve disc being adapted to reciprocate axially along a fixed, vertical guide post centrally mounted upon and subtending from inside the top of the upper casing segment, an annular restricted flow passage being formed between the bore of the valve disc and outer surface of the fixed guide post, an axial bore extending through an upper portion only of the fixed guide post and joining a transverse bore therein which extends completely therethrough, said guide post axial bore ending at a second closed endwall which defines at least one radial port extending from the outer periphery of said guide post and into the interior of said guide post axial bore, a lower portion of the main valve disc also having a transverse bore extending completely therethrough in fluid communication with the axial bore through said valve disc radial port whereby fluid is able to enter the main valve upper chamber through said valve disc radial port into said valve disc axial bore along the exterior of said guide post when the main valve disc axial bore endwall abuts said guide post when the main valve and the pilot valve are each in a fully open position, said upper chamber being vented through said pilot valve to the exterior of said float valve assembly when said pilot valve is actuated, opening and closing of the main valve disc resulting in part from fluid pressure differentials between the main valve lower chamber and the upper chamber, closing movement of the main valve being due to surface area under pressure of the main valve disc facing the upper chamber being greater than the surface area under pressure of said disc facing the lower chamber due to the bottom of the disc facing a low pressure bottom fluid outlet.

9. A pilot-operated, diaphragm-controlled, float valve assembly with a two-segment split casing comprising upper and lower segments with mating flanged edges joined to form a main valve cavity, a side fluid inlet and a bottom fluid outlet both formed in the lower segment, fluid entering the inlet flowing onto a main valve annular seat surrounding the bottom outlet, a flexible, self-supporting diaphragm with a flanged edge mounted between the casing segments and dividing the valve cavity into upper and lower chambers, the diaphragm being dish-shaped with an intermediate, upwardly directed and convexly curved rim portion causing it to be self-biased towards the main valve annular seat, the diaphragm also having a central aperture with a main valve disc mounted therein for vertical reciprocating movement between the valve chambers in association with movement of the diaphragm, the main valve disc having a concave, cup-shaped, frusto-conical upper portion and a cylindrical lower portion with an external circumferential, flat-walled channel into which there is adapted to be fitted a flanged inner edge forming a central circular aperture of the diaphragm for mounting the main valve disc onto the diaphragm, the lower portion of the main valve disc also having a continuous, sealed, bottom surface formed with a flat-topped peripheral annular wall forming a sealing surface for the main valve annular seat and being held in a normally full-closed position against the main valve seat by bias of the diaphragm to prevent fluid backflow from the outlet to the inlet under conditions of low fluid pressure, the main valve disc having an axial bore extending partly through the length thereof from the top of the disc to a first closed endwall above the continuous sealed bottom of the disc, said first endwall defining at least one radial port extending from the outer periphery of said valve disc and into the interior of said valve disc axial bore and said valve disc being adapted to reciprocate axially along a fixed, vertical guide post centrally mounted upon and subtending from inside the top of the upper casing segment, an annular restricted flow passage being formed between the bore of the valve disc and outer surface of the fixed guide post, an axial bore extending through an upper portion only of the fixed guide post and joining a transverse bore therein which extends completely therethrough, said guide post axial bore ending at a second closed endwall which defines at least one radial port extending from the outer periphery of said guide post and into the interior of said guide post axial bore, a lower portion of the main valve disc also having a transverse bore extending completely therethrough in fluid communication with the axial bore through said valve disc radial port whereby fluid is able to enter the main valve upper chamber through said valve disc radial port into said valve disc axial bore along the exterior of said guide post when the main valve disc axial bore endwall abuts said guide post and when the main valve and the pilot valve are each in a fully open position, opening and closing of the main valve disc resulting in part from fluid pressure differentials between the main valve lower chamber and the upper chamber, closing movement of the main valve disc being due to surface area under pressure of the main valve disc facing the upper chamber being greater than the surface area under pressure of said disc facing the lower chamber due to the bottom of the disc facing a low pressure bottom fluid outlet, the pilot valve is mounted within the upper casing segment and comprises a piston reciprocatable within a cylinder in association with movement of a float lever arm pivotally mounted on the upper casing segment, the top of the fixed guide post surrounding the axial bore forming a fixed valve-sealing seat for the pilot valve the piston of which has a bottom with a resilient sealing member thereon for sealing contact with the seat, the fixed guide post having a bore extending through the upper portion thereof for pressure relief discharge of liquid through the guide post and pilot valve and into a tank, reservoir or the like when the pilot valve is lifted by the float into the open position.

* * * * *